June 3, 1958 W. D. GABOR 2,837,648

ELECTRICALLY CONTROLLABLE INDUCTOR METHOD AND APPARATUS

Filed Sept. 20, 1954 3 Sheets-Sheet 1

INVENTOR.

WILLIAM D. GABOR

BY

Curtis, Morris & Safford

ATTORNEYS.

INVENTOR:
WILLIAM D. GABOR
BY
Curtis, Morris & Safford
ATTORNEYS.

June 3, 1958 W. D. GABOR 2,837,648

ELECTRICALLY CONTROLLABLE INDUCTOR METHOD AND APPARATUS

Filed Sept. 20, 1954 3 Sheets-Sheet 3

INVENTOR
WILLIAM D. GABOR
BY
Curtis Morris & Safford
ATTORNEYS.

United States Patent Office 2,837,648
Patented June 3, 1958

2,837,648

ELECTRICALLY CONTROLLABLE INDUCTOR METHOD AND APPARATUS

William D. Gabor, Norwalk, Conn., assignor to C. G. S. Laboratories, Inc., Stamford, Conn., a corporation of Connecticut Application September 20, 1954, Serial No. 457,265

21 Claims. (Cl. 250—36)

The present invention is in the field of electrically controllable inductor method and apparatus. More particularly the present invention relates to controllable inductor apparatus having multiple signal windings well adapted to frequency sweep operation and to methods of controlling the magnetic flux in the various portions of the cores of controllable inductors to provide wide sweeps of frequency at high "Q" and to adjust the ranges of the sweeps in frequency and the "Q" as desired.

Controllable inductors generally operate on the principle of the saturable reactor but are capable of operation at substantially higher frequencies. In the controllable inductor described herein a core of magnetically saturable ferromagnetic material carries one or more signal windings, and associated with this core is a control winding which is used to control the degree of saturation of the core and thus to control inductance of the signal windings. When the control current has zero value, the signal windings have their maximum effective inductance. As the magnitude of the control current is increased, with resulting increase in the magnetic saturation of the core, the effective inductance of the signal windings decrease.

The controllable inductor described is particularly well adapted for sweeping through a range of inductance values. That is, the magnitude of the control current is cyclically swept through a range of values causing a corresponding cyclic sweep in the inductance of the signal windings. With the signal windings suitably coupled to resonant circuits, the resonant frequency of the circuit is caused to deviate in accordance with the inductance changes.

Among the advantages of the methods and apparatus described is that they enable wide sweeps in frequency and enable the frequency to be swept up or down from any point within a wide range of frequencies. The controllable inductor described can be operated at any point in the range from 3.7 to 219 megacycles by the use of its various signal windings over four frequency bands. Advantageously, this wide range in operation is obtained with a low consumption in control power. At all points within this range it can be swept over a wide range of inductance values, enabling wide frequency deviations in the controlled circuit.

In the controllable inductor described four signal windings and three signal core portions are used, with two of the signal windings being wound on the same core. For operation at the highest frequency one of these two windings serves as a short circuited loop around the core, raising the effective "Q," as explained in detail hereinafter.

For operation in an intermediate frequency band the fluxes in two of the cores are in aiding relationship and serve to raise further the frequency range obtainable. In the low frequency range the fluxes in two of the cores buck against each other, raising the effective "Q" further.

The controllable inductor described herein is well suited for use in sweep generators of the type used in connection with the repair and adjustment of television receivers, often called TV sweep generators.

The methods described enable the adjustment of the effective range in inductance changes, provide changes in "Q," and enable adjustment of the shape of the curve of inductance as a function of frequency. Thus, two or more controllable inductors can be adjusted by the methods described so as to follow along together, i. e. to "track" each other.

The various aspects and advantages of the present invention will be more fully understood from the following description considered in conjunction with the accompanying drawings, in which.

Figure 6:
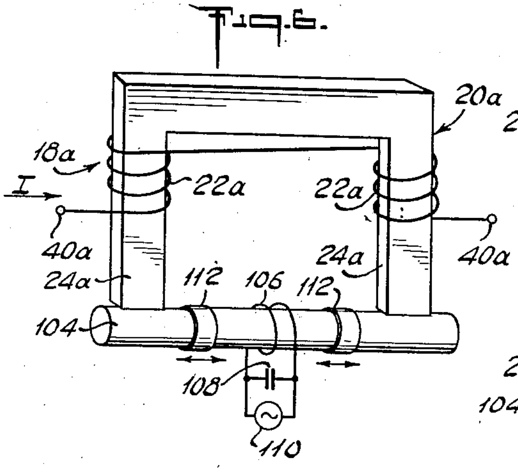
Figure 7A:
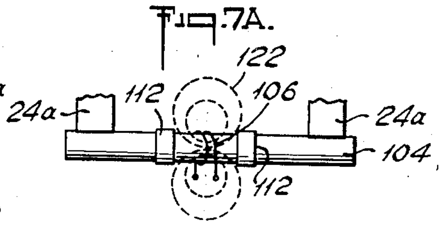
Figure 7B:
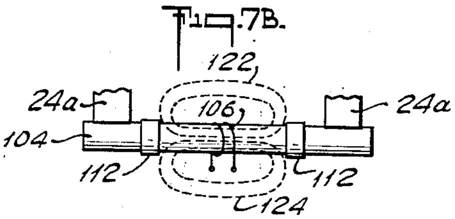
Figure 8:
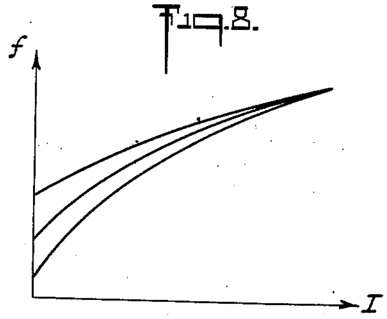
Figure 9:
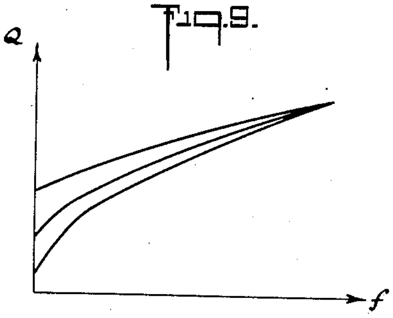

Figures 5A, 5B, 5C, and 5D show and explain flux control elements which may be used in connection with the method of the present invention;

Figure 6 is a perspective schematic diagram for purposes of explaining aspects of the methods of the present invention;

Figures 7A and 7B are diagrams for further explanation of methods;

Figures 8 and 9 are curves for purposes of explanation; and

Figures 10, 11, and 12A and 12B are diagrams showing further aspects of the methods described.

Figure 2:
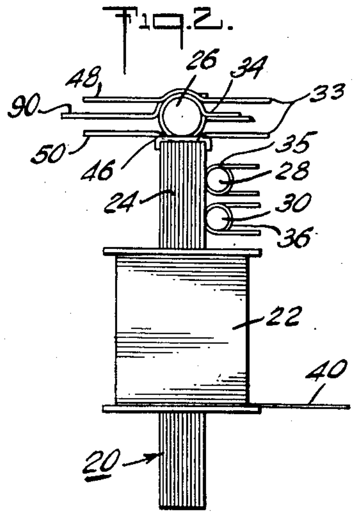
Figure 2 is a left side elevational view of the controllable inductor of Figure 1.
Figure 3:
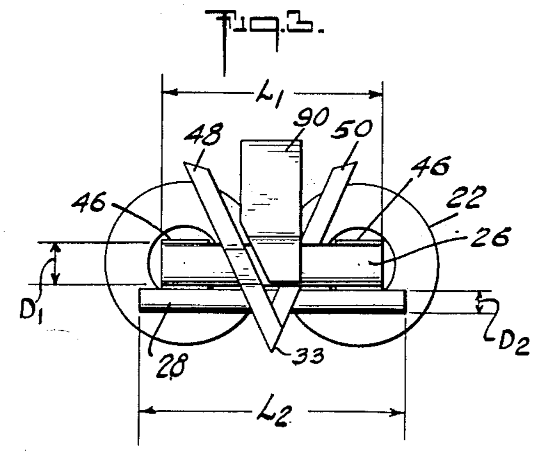
Figure 3 is a top view of the controllable inductor of Figures 2 and 3.
Figures 4, 5A, 5B, 5C, 5D:
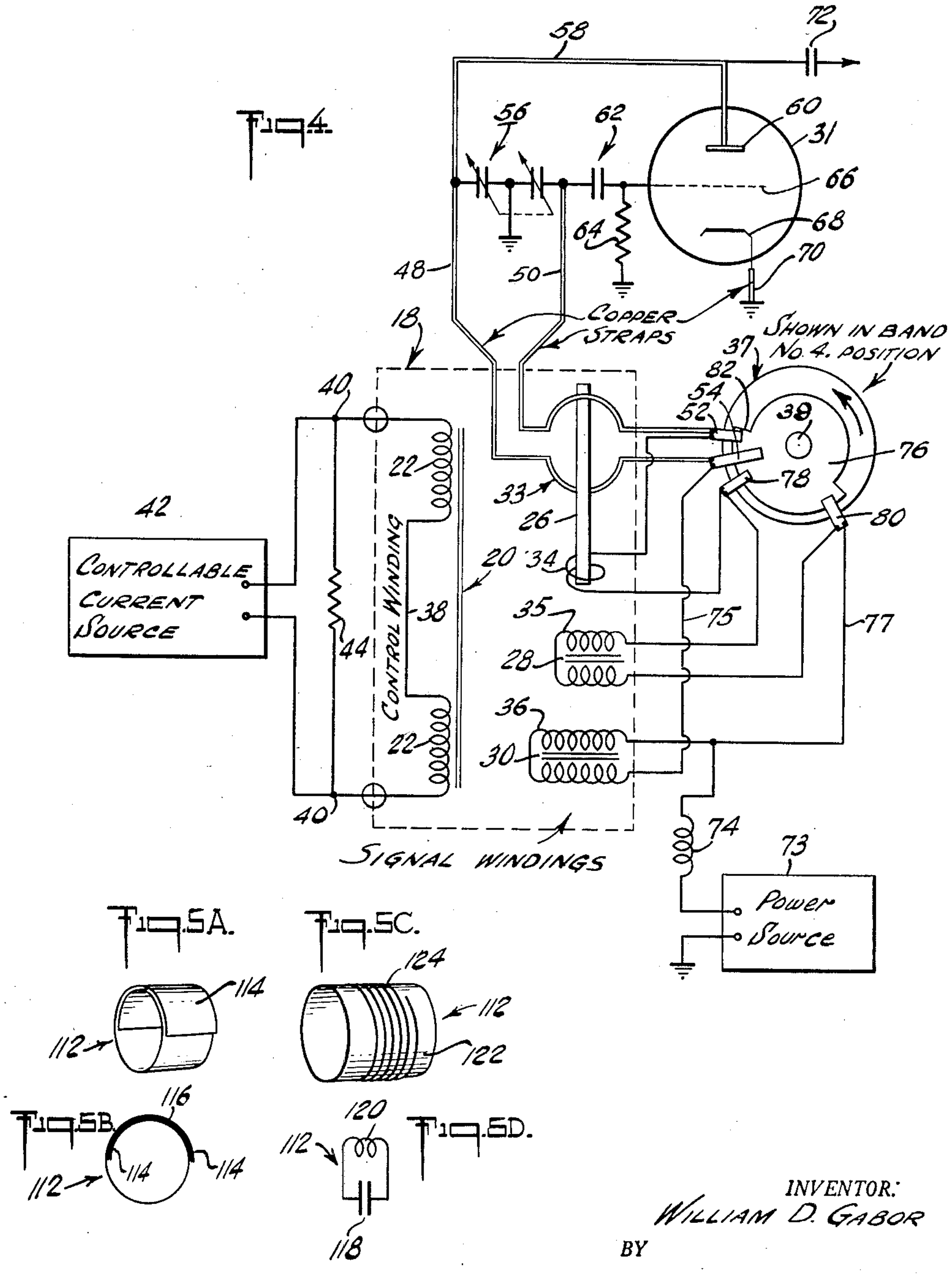
Figure 4 is a schematic circuit diagram of the connections of the controllable inductor and band switch of Figure 1 in an oscillator circuit.

The controllable inductor 18 shown in Figures 1, 2, 3, and 4 includes, generally, a control core portion or yoke 20 with a pair of control windings 22 around each of the legs 24 of the yoke and with three signal core rod portions 26, 28, and 30 bridged across between the ends and sides, respectively of the legs 24. As shown in Figure 4 the controllable inductor 18 is associated with a vacuum tube 31 in an oscillator circuit 32 so that by changing the inductance of the four signal windings 33, 34, 35, and 36 on the three signal cores 26, 28, and 30, the frequency generated by the oscillator circuit 32 is controlled accordingly.

A four-position band switch 37 switches the operation of the various signal windings 33, 34, 35, and 36 on the cores 26, 28, and 30 to enable operation in any one of four frequency bands. Band No. 1 includes the range of lowest frequencies, with Bands 2, 3, and 4 including overlapping ranges of successively higher frequencies. The shaft 39 of the switch is connected to a control (not shown) to enable manual or automatic switching between bands.

The control windings 22 are connected in series flux-aiding relationship by a lead 38, thus in effect to form a single means for varying the amount of control flux in the signal cores 26, 28, and 30. The two terminals 40 of the control windings 22 are connected to a controllable power source, generally indicated in block form at 42, for example, such as a saw-toothed unidirectional current source, to cause cyclic sweeping of the controlled inductance values at a repetition rate of, say 60 cycles per second. A resistor 44 may be shunted across the control windings 22 to improve their response to the saw-toothed control current from the source 42.

As the current through the control windings 22 is increased, an increased amount of flux flows along through the length of the three control core rods 26, 28, and 30. These rods are of a saturable ferromagnetic material known as ferrite, sometimes called ferromagnetic ceramic. This type of material is discussed by Snoeck in U. S. Patents Nos. 2,452,529; 2,452,530; and 2,452,531. As the degree of magentic saturation of the core rods 26, 28, and 30 is increased, its incremental permeability, that is, permeability to alternating flux, decreases. Hence the inductance of any signal winding thereon decreases, and vice versa when the control current is reduced. It should be kept clearly in mind that the unidirectional control flux which flows through the length of the rods 26, 28, and 30 is entirely different from the high frequency alternating signal flux associated with the respective signal windings 33, 34, 35, and 36, and which may occupy varying regions of these rods under different conditions, as explained hereinafter. This signal flux corresponds to the frequency being generated by the oscillator circuit and may in this described embodiment be anywhere in the range from 3.7 to 219 megacycles.

The core rod 26 is bridged across the ends of the legs 24 and is isolated therefrom by means of copper shims 46 which are 2 mils thick. This core rod has a larger diameter and shorter length than either core 28 or 30. It carries both windings 33 and 34 and is used for operation both in Band No. 3 and Band No. 4.

For operation in Band No. 4, the winding 33 is used. It is a single turn winding formed by a pair of copper straps 48 and 50, which are respectively curved over and under the rod 26 with their forward ends pointed and converging to positions directly over one another. The forward ends of the straps 48 and 50 are connected to the first and second contacts, 52 and 54, respectively, of the switch 37.

Figure 1:
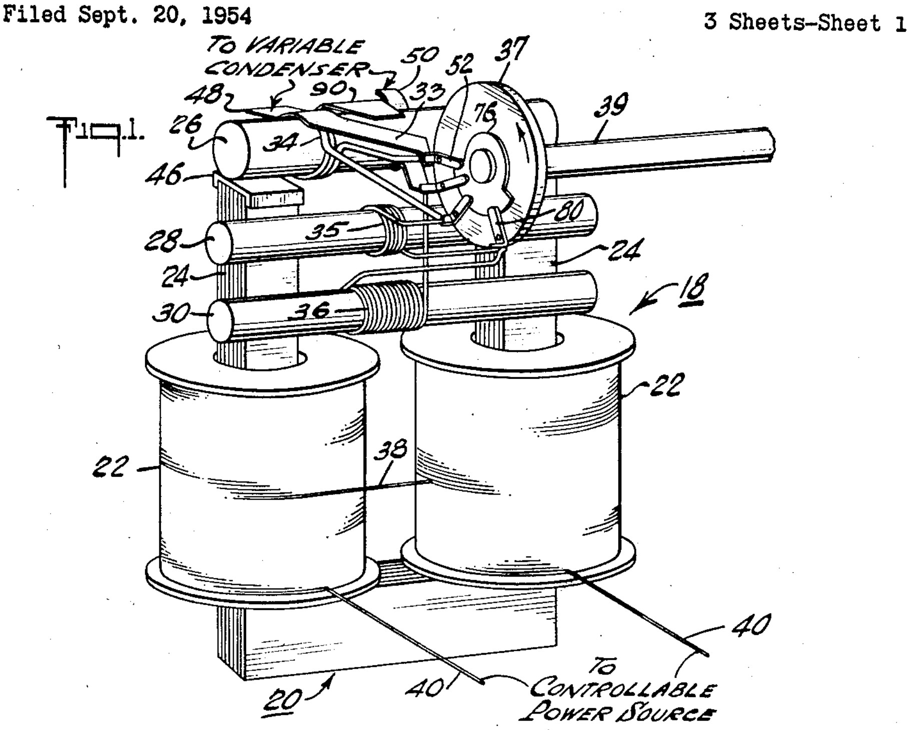
Figure 1 is a perspective view of a controllable inductor and a four-position band switch arrangement embodying the present invention.

In order to form a resonant circuit for the tube 31, the rear ends (as seen in Figure 1) of the straps 48 and 50 are connected to opposite sides of a two section variable condenser 56, having its rotor connected to the common return circuit of the circuit, i. e. "grounded." The strap 48 is connected through a strap 58 to the plate 60 of the triode 31, and the strap 48 is coupled through a condenser 62 and across a grid return resistor 64 to the grid 66 of the triode 31, which has its cathode 68 grounded by a copper strap 70. The alternating voltage appearing at the plate 60 is coupled through a condenser 72 to the output, which, for example, may be a broad band high frequency amplifier adapted to amplify the sweeping frequencies from the oscillator circuit 32. The high voltage direct current for the plate of the tube 31 is fed from a suitable power supply source 73, such as a conventional step up transformer, rectifier and filter unit plugged into connection with conventional 60 cycle, 120 volt power lines. This D. C. power is fed through a radio frequency choke coil 74 and a lead 75 connected to the switch contact 54.

I find that it is advantageous to use the copper straps to form the winding 33 as shown because they exhibit a lower self-inductance than a round wire of comparable size. These are 3/16 inch wide, .008 inch thick, of soft copper. Moreover, the straps 48 and 50 effectively occupy or surround more of the length of the rod 26 so as to confine the high frequency signal flux to substantially the full "operating" length of the rod 26 so as to obtain a wider range in frequency. In Band No. 4 the operating length of the rod 26 is less than its full length because the winding 34 is short-circuited and effectively shields the left end of the rod 26 from the signal flux induced by the winding 33 to increase the "Q," as explained below. Winding 34 is short-circuited by the copper disk 76 on the rotor of the switch 37. In the Band No. 4 position as shown, this disk 76 bridges all of the switch contacts 52, 54, 78, and 80, with the winding 34 being connected between the contacts 52 and 78.

In a commercial sweep generator circuit utilizing this controllable inductor arrangement, the variable condenser 56 is a two section condenser having about 150 micromicrofarads per section, each section adjustable down to 6 mmf., a suitable condenser being the Hammarlund HFD–140. Thus, effectively, the resonant circuit comprising the condenser 56 and the one turn winding 33 has a capacitance which can be adjusted from 3 to 75 mmf. In this circuit the control current is swept from 0 to 100 milliamperes. In the Band No. 4 position, with the condenser 56 adjusted to 3 mmf., as the control current sweeps from 0 to 100 ma. the output frequency sweeps from 200 to 219 megacycles, a frequency ratio of about 1 to 1.1. As the capacitance of condenser 56 is increased, the frequency ratio remains about the same and the operating point moves down to lower frequencies. With 75 mmf., a change in control current from 0 to 100 ma. sweeps the output from 70 to 77.5 megacycles.

Among the many advantages of this circuit is the fact that it can be used so that it either sweeps "up" or "down" from a given frequency point, not sweeping on either side of a center frequency, as in many sweep generators. Thus, the cores 26, 28, and 30 may be started at unsaturated condition and swept up to full saturated condition, i. e. from minimum to maximum frequency, or may be started at saturated condition and swept down to unsaturated condition. By varying the amount of change in the control current, the range of sweep is expanded or contracted, but the starting point always remains the same, i. e. either at the top or bottom of the sweep, as the case may be. This greatly facilitates the use of the sweep generator. For example, in examining a TV set the starting point of the sweep is set just below the desired range to be tested and the generator sweep is expanded or contracted so as to cover the desired range.

The usual operation is to blank out the oscilloscope indicating instrument accompanying the sweep oscillator so as to prevent the trace of the "return" sweep from appearing.

Another advantage of the arrangement shown is that in Band No. 4 position the switch 37 and plate power source 73 are connected to the winding 33 at a point electrically equidistant from the two sides of the condenser 56 whose rotor is grounded. Thus, the switch 37 and power source 73 are at a balance point in the resonant circuit where the voltage fluctuates very little with respect to "ground." Accordingly, any stray capacitances which may exist between the switch or power source elements and the "ground" circuit have no effect, and the upper frequency limit of the circuit is correspondingly extended.

When the switch 37 is turned counter-clockwise from the position seen in Figure 4 to the next (Band No. 3) position, the step 82 in the disk 76 stops between the contacts 54 and 78, separating the contact 52 from the disk 76, but leaving the longer contact 54 engaged. In Band No. 3 position the two-turn winding 34 is connected between and in series with the two halves of the winding 33 by means of the contacts 78 and 54, so as to form a three-turn winding on core 26. Also, the full length of core 26 is now used by the signal flux, for the winding 34 is no longer short-circuited. In Band No. 3 position a frequency ratio of 1.5 to 1 is obtained from the oscillator circuit. Thus, with the condenser 56 at 3 mmf., a change in control current from 0 to 100 ma. produces a frequency sweep from 67 to 107 megacycles. With the condenser 56 at 75 mmf., a corresponding control current change produces a sweep from 25.5 to 44.5 megacycles. Corresponding sweeps over intermediate frequencies occur with intermediate condenser settings. The winding 34 is two turns of No. 20 enameled wire wound close together and located beneath the upper strap 48.

Among the advantages of this arrangement is that in the Band 3 position the switch 57 is still located electrically in a position approaching somewhat to the balance point, being respectively one-half, and two and one-half, turns from the opposite sides of the condenser 56. Because the one-half turn is on the plate side of the resonant circuit and because lower frequencies are involved, the slight unbalance in switch capacity effect causes no significant loss in range.

In Band No. 2 position the step 82 of the disk 76 lies between the contacts 78 and 80 so that the winding 35, a six-turn winding of No. 26 enameled wire closely wound, is connected in series with and between both the windings 33 and 34. This forms a coil having effectively nine windings, three on core 26 and six on core 28. The connections are traced from the strap 50 to the contact 52 and from this contact 52 through winding 34 to contact 78 (which is now also separated from the disk 76) and from contact 78 through the winding 35 to the contact 80, and then back through the disk 76 to the contact 54 and the other strap 48.

In Band 2 position I find it advantageous to have the winding 35 on core 28 arranged so that the magnetic polarity of the core 28 for signal flux is opposite to that for the core 26. Thus, the signal flux from all three windings 33, 34, and 35 tends to traverse the full length of both of the cores 26 and 28. Accordingly, only a very small length of the signal flux path is not confined to the ferrite material of rods 26 and 28. The result is to extend the low frequency end of Band 2, as desired.

In Band 2 position a frequency ratio of about 2.0 to 1 is obtained. With the condenser 56 at 3 mmf., a change in control current from 0 to 100 ma. produces a frequency sweep from 33 to 57 megacycles. With 75 mmf., a corresponding control current change produces a sweep from 12 to 24 megacycles.

In the Band No. 1 position, all three contacts 52, 78, and 80 are free of the disk 76. Accordingly, the winding 36 is connected in series with all of the other windings, being connected between the contact 80 at one end of the winding 35 and the lead 75 which goes back to the contact 54 and strap 48. The winding 36 is a twenty-four turn winding of No. 26 enameled wire closely wound.

In order to obtain higher "Q" at the low frequency end of the low Band, I find it advantageous to force some of the signal flux in the core 30 to travel a longer part of its total path in air, and so I arrange the magnetic polarity of the core 30 for signal flux the same as that of the adjacent core 28. Thus, none of the flux from the core 28 tends to link with core 30 and tends to leave its core short of the ends, travelling further in air. This method is explained more hereinafter.

In Band No. 1, a 2.5 to 1 frequency ratio is obtained. At 3 mmf. a change in control current from 0 to 100 ma. produces a sweep from 11 to 28 megacycles. At 75 mmf. a corresponding control current change produces a sweep from 3.7 to 10.7 megacycles.

Referring again to Figures 1, 2, and 3, it will be noted that the rear ends of the straps 48 and 50 diverge at about a 45° angle. This is advantageous in effectively spreading the winding 33 along the length of the core 26, thus increasing the effective confinement of flux to this core by the straps 48 and 50, and at the same time it produces the shortest length connections from the switch contacts 52 and 54 to opposite sides of the condenser.

In Figures 1, 2, and 3, associated with the core 26 and with the straps 48 and 50 is shown a generally rectangular flux control shield 90 having its forward end, as seen in Figure 1, curved up over the rod 26, and having its rear edge extended back between the straps 48 and 50 to a position close to the condenser plates (not shown). It may preferably extend back between the two halves of the condenser 56. The plane of the sheet 90 is parallel with the axis of the rod 26. The frequency ranges given above are all in the absence of this shield. Its presence appears to me to have important effects in Band No. 4 position at the high frequency end, when the inclusion of the shield raises the sweep range and deviation from 200–219 to 203–231 megacycles.

My explanation of the effect of this shield is that due to the 45° angle between the straps 48 and 50 some fraction of the signal flux tends to travel between them in a path perpendicular to the plane of the drawing in Figure 3. For flux traveling in such a path the effective area within the loop defined by the two diverging straps is greater than the area defined by these straps as seen end on in Figure 2. Hence a greater winding self-inductance exists for flux in this path, which reduces the frequency somewhat. At the top end of this band when the rod is fully saturated, so that effectively its permeability is about the same as that of air, I assume that more of the signal flux tends to follow this perpendicular path. The shield 90, a thin sheet of soft copper with its front corner cut off so as to clear the strap 48, substantially prevents any such perpendicular flux and hence lowers the inductance and raises the frequency, most markedly at full saturation of the rod 26.

The rods 28 and 30 have a length $L_2$ of 2 inches (+.000, −.015) and a diameter $D_2$ of about 3/16 inch, namely, .187 inch (+.015, −.000). The rod 26 has a length $L_1$ of 1.63 inches (+.000, −.015) and a diameter $D_1$ of about 5/16 inch, namely, .313 inch (+.015, −.000). I find that this relationship is far better than having all of these rods the same size or length.

The control windings 22 each comprise 3000 turns of No. 31 enameled wire. The yoke 20 comprises a stack of 13 laminations of transformer iron each .030 inch thick. The legs 24 are accordingly .390 inch thick, and are each .312 inch wide and spaced apart one inch. As seen in Figure 2, the rods 26, 28, and 30 are parallel and are spaced vertically 3/8 inch on centers.

Figure 12A:
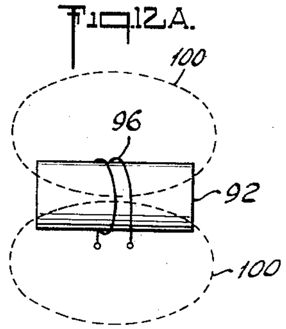
Figure 12B:
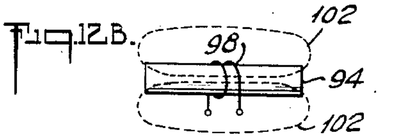

My explanation for the improved "Q" which is obtained with the larger diameter shorter rod is schematically illustrated in Figures 12A and 12B, where rods 92 and 94 are pieces of round ferrite rods of the same length with signal windings 96 and 98, respectively. Assuming that the cores 92 and 94 are unsaturated, then the signal flux will follow along paths somewhat like the paths 100 and 102, respectively. As seen, a larger percentage of the total length of the paths 100 associated with the larger diameter core 92 lies in the air. Because ferrite exhibits some lossy characteristics at low values of saturation, the coil 96 will consequently exhibit a higher "Q," but not so high an inductance as the coil 98, because a smaller percentage of the flux path 100 lies in the permeable core material than does flux path 102. At full saturation, the ferrite has about the same permeability as air, so that the "Q" of the two coils will both be higher than before and about equal, the inductance of winding 98 being less because of its smaller diameter. Thus, coil 96 has a higher "Q" for large values of inductance but does not produce as wide an inductance change.

These relationships can be expressed as follows:

$$Q=F\left(\frac{D}{L}\right) \quad (1)$$

$$\Delta f=F\left(\frac{L}{D}\right) \quad (2)$$

where $\Delta f$ is the frequency deviation.

Further aspects of this method of producing desired "Q" and frequency deviation characteristics are shown in Figures 6 through 9, where elements of the apparatus performing functions corresponding to those in Figures 1–4 have corresponding reference numbers followed by the suffix "*a*."

The controllable inductor 18*a* has a signal core 104 bridged across between the legs 24a of the yoke 20a. Around the center of this rod is a signal winding 106 shunted by a condenser 108 to form a resonant circuit driven by an oscillator 110. Around this core 104 on each side of the signal winding 106 are a pair of slidable flux control loops 112 of electrically conductive material. These loops are arranged to provide a shorted-turn effect on the signal flux, while they are arranged to have substantially no effect on changes in the control flux. Figures 5A and 5B show one such loop comprising a wide strip 114 of electrically conductive material rolled up with the ends overlapping a substantial distance and insulated from each other by a thin insulation layer 116. The capacitance 118 (see Figure 5D) provided by the overlapping ends of the strip 114 is sufficient to cause the loop 112 to act a resonant circuit, as indicated in Figure 5D. The length of the strip 114 provides the inductance 120. The capacitance 118 and inductance 120 are so small that the loops 112 are effectively open-circuited for low frequencies; so the loop 112 has no effect on the low frequency cyclic changes of the control flux. But the loops 112 are resonant at a frequency below the lowest signal frequency and so act effectively as short-circuited loops around the rod 104 to prevent the passage of signal flux out into the ends of the rod 104 beyond the respective locations of loops 112.

In Figure 5C is shown another embodiment of a flux control loop 112. It comprises a tubular insulator form 122 with a few turns of wire 124 closely wound thereon. The distributed capacity of the winding 123 forms the capacitance 118.

As shown in Figures 7A and 7B, when the control loops 112 are located close to the signal winding 106, the signal flux paths 124 behave as if the rod 104 were only as long as the length between the loops 112, i. e. the "operating" length of the rod 104 is cut down. In accordance with Equations 1 and 2, since the loops 112 effectively reduce the length of the rod 104, the ratio of $D/L$ is increased, raising the "Q" but lowering the operating range. In Figure 8 the upper curve 130 of frequency plotted against control current "I" represents the operating characteristics caused by the inner position of the loops 112 shown in Figure 7A. The corresponding upper curve 130' in Figure 9 of "Q" versus frequency "*f*" shows how the "Q" is raised at the lower frequencies by the inner positions of loops 112.

The curves 132 and 132' represent the operating conditions when the loops 112 are in an intermediate position, such as shown in Figure 6. The bottom curves 134 and 134' show the characteristics when the loops 112 are out near the legs 24a, as shown in Figure 7B. The signal flux paths 125 now have a greater percentage of their total length in the ferrite material.

Figure 10:
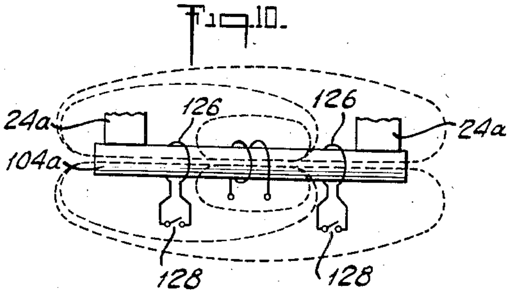

This method is similar to the operation of the winding 34 in Band No. 4. As shown in Figure 10, the loops 112 are replaced by single wire loops 126 and switches 128. When both switches are open, the signal flux follows paths 136. When one of them is closed, say the right one, the signal flux follows paths 138, and when both are closed the paths 140 are followed. In effect, opening and closing the switches 128 is the same as moving one or the other of the loops 112 along the rod.

The short-circuiting of the loops 126 does not have a significant effect on the control flux, when the control flux has a low frequency rate of change, for example 60 C. P. S. But for higher frequency changes in the control flux the resonant type of loops in Figures 5A and 5C are preferable.

Figure 11:
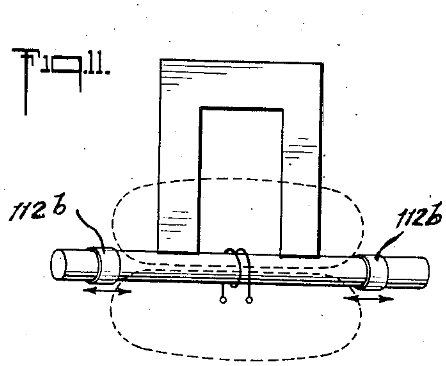

In Figure 11, a longer signal core rod 104b bridges the legs 24b of the yoke 20b and extends a substantial distance beyond either side of the legs 24b. Slidable flux control loops 112b around either end of the rod 104b control its operating length by controlling the point at which the signal flux 142 leaves the rod 104b.

As used herein "Q" is the quality factor of the particular circuit component or circuit under discussion and is a function of the ratio between the energy which can be stored in the component or circuit during a cycle to the energy which is dissipated during a cycle.

A sweep generator circuit well adapted for use with the controllable inductor described herein is described and claimed in my copending application Serial No. 457,227, filed September 20, 1954.

From the foregoing description, it will be understood that methods and apparatus of the present invention are well adapted to provide the many advantages described above and that the methods and apparatus described can be used in a wide variety of applications and that various changes or modifications may be made in adapting them to particular applications, and that various features of the invention may be used without a use of corresponding other features. The scope of my invention, as defined by the following claims is intended to include such changes or modifications, limited only by the prior art.

What I claim is:

1. An electrically controllable inductor comprising a yoke of magnetically permeable material having a pair of legs, a rod of ferrite material having two ends, one of said ends being closely adjacent one of said legs and the other of said ends being closely adjacent the other of said legs with the rod extending between said legs, a pair of conductive strips extending around opposite sides of said rod, an end of each of said strips being adjacent, and switch means connected to said ends.

2. An electrically controllable inductor comprising a yoke of magnetically permeable material having a pair of legs, a control winding on said yoke, a rod of saturable ferromagnetic material having a pair of end portions, said rod being bridged across between said legs with each of said end portions being closely adjacent respective ones of said legs, a single turn winding of flat strip material on said rod, the ends of said winding lying approximately in the same plane approximately parallel with the axis of said rod and diverging from each other at a substantial angle, and a sheet of electrically conductive material in said plane between said ends.

3. An electrically controllable inductor comprising electromagnetic control means having a pair of ferromagnetic legs, a rod of ferrite material bridged across between said legs with the ends of said rod projecting out beyond said legs on each side, a first turn of electrically conductive material around said rod between said legs, a second turn of electrically conductive material around said rod on one of its projecting ends.

4. An electrically controllable inductor comprising electromagnetic control means having a pair of legs, a rod of ferrite material bridged across between said legs, and first and second windings on said rod between said legs, said first winding including a wide strip of electrically conductive material having a break therein approximately electrically equidistant from its ends, and switch means arranged in one condition to connect said second winding in series with said first winding at said break.

5. An inductor as claimed in claim 4 wherein said first winding comprises a pair of strips extending at least around opposite sides of said rod and diverging at a substantial angle as seen perpendicular to said rod, said switch means being arranged in another condition to make a connection across said break and simultaneously to short-circuit said second winding.

6. A controllable inductance unit comprising magnetic control means, a core portion of saturable magnetic material magnetically coupled to said control means, said control means controlling the magnetic flux in said core portion, a higher frequency winding on said core portion, a lower frequency winding on said core portion, switch means having at least two conditions, in its first condition serving to short-circuit said lower frequency winding and to complete the circuit through said higher frequency winding whereby said lower frequency winding serves as a short-circuited conductive path around said core portion, and a second condition wherein a circuit is completed through said lower frequency winding.

7. A controllable inductance circuit comprising a ferromagnetic control core portion, a control winding on said control core portion, said control core portion having two spaced regions, a signal core portion of saturable ferromagnetic material extending between said regions, first and second signal windings on said signal core portion, said first signal winding being divided into two parts, a common circuit connection, a two section variable condenser having a pair of fixed elements and a rotor commonly associated therewith and having its rotor connected to said common circuit, one of the halves of said first winding being connected to each of the fixed elements, an amplifier having control and controlled electrodes, means coupling one of the halves of said first winding to each of said electrodes, said amplifier having a return circuit connected to said common connection, and a switch device having at least two conditions, in its first condition connecting said two halves in series and in its second condition connecting said second winding in series with and between said two halves, control means for said switch device, and a controllable current source for said control winding.

8. A controllable inductor comprising electromagnetic control means having two regions of significant magnetic permeability, a first rod of ferrite having two end portions, with each of said end portions closely adjacent one of said regions and with said first rod extending between said regions and having a predetermined transverse dimension $D_1$ and predetermined length $L_1$, a first signal winding thereon, a second rod of ferrite spaced from said first rod and having two end portions, with each of said end portions closely adjacent a respective one of said regions and with said second rod extending between said regions, a second signal winding thereon, said second rod having a predetermined transverse dimension $D_2$ smaller than said first rod and a predetermined length $L_2$ greater than said first rod.

9. A controllable inductor as claimed in claim 8 wherein the ratio between $D_1$ and $D_2$ is about 5 to 3 and the ratio between $L_1$ and $L_2$ is about 2 to 1.6.

10. An electrically controllable inductor comprising electromagnetic control means having a pair of spaced legs of significant magnetic permeability, a plurality of spaced, substantially parallel, saturable ferromagnetic rods bridged across between said legs, at least one signal winding on each of said rods, the signal windings on two adjacent rods being wound in effectively opposite directions, the signal windings on two adjacent rods being wound in effectively the same direction, and switch means connected to said windings and arranged when in a first condition to connect the signal windings on said first two adjacent rods in series and arranged when in a second condition to connect the latter two signal windings in series.

11. A controllable inductor comprising a yoke of magnetically permeable material having spaced legs, a control winding on said yoke, a first round ferrite rod adjacent the ends of both of said legs and bridged across between said legs, a plurality of round ferrite rods having a smaller diameter than said first rod and being bridged across between said legs, and at least one signal winding on each of said rods.

12. A controllable inductor comprising electromagnetic control means and three signal core portions associated therewith, the magnetic saturation of each of said three signal core portions being controlled by said electromagnetic control means, a signal circuit, at least one signal winding on each of said signal core portions, and a switch device having a number of conditions, in its first condition connecting said three signal windings associated with said three signal core portions in series in said circuit, in its second condition connecting two of said signal windings in series in said circuit, and in its third condition connecting one of said signal windings in said circuit.

13. In the art of controlling the inductance characteristics of a winding on a ferrite rod wherein the permeability of the ferrite rod is changed by varying the degree of its magnetic saturation at a relatively low rate and wherein the winding is subjected to alternating current signals of a higher frequency that improvement which comprises placing a second winding on said rod, connecting switch means thereto and changing the ratio between the effective length and effective diameter of the portion of said rod through which passes the alternating flux induced by the higher frequency alternating current signals by closing said switch means for short-circuiting said second winding.

14. An electrically controllable inductor comprising magnetic control means having two spaced regions of significant magnetic permeability and first, second, and third substantially parallel, magnetically saturable ferromagnetic rods all having respective end portions closely adjacent said spaced regions with said rods extending therebetween, at least one signal winding on each of said rods, the signal windings on the first and second rods being wound in effectively opposite directions, and the signal windings on the second and third rods being wound in effectively the same direction, and switch means arranged when in a first condition to connect the said signal windings on the first and second rods in series and arranged when in a second condition to connect the said signal windings on the second and third rods in series.

15. An electrically controllable inductor as claimed in claim 14 and wherein said switch means in its second condition connects the said windings on said first, second, and third rods all in series.

16. A controllable inductor comprising magnetic control means having two spaced regions of significant magnetic permeability, a plurality of signal core portions of saturable ferromagnetic material extending a substantial portion of the distance between said two spaced regions and carrying magnetic flux from said control means between said spaced regions, a signal circuit, at least one signal winding on each of said signal core portions, and a switch device having at least three conditions, in its first condition connecting at least three signal windings in series in said circuit, in its second condition connecting at least two signal windings in series in said circuit and short-circuiting the third winding of said three, and in its third condition connecting at least one signal winding in said circuit and short-circuiting the other two windings of said three windings.

17. A controllable inductor comprising magnetic control means having two spaced regions of substantial magnetic permeability and at least three signal core portions of saturable ferromagnetic material bridged across between said regions with their axes substantially parallel, at least one signal winding on each of said core portions, a switch device, having at least three conditions, a signal winding on the first and a signal winding on the second core portion being connected to said switch device with the windings wound around their core portions in opposite directions, a signal winding on the third core portion being connected to said switch device with the winding wound in opposite direction from said winding on the second core portion, a signal circuit, said switch device in a first condition connecting said three windings in series in said circuit, said switch device in a second condition connecting said windings on the first and second core portions in series in said circuit, and said switch device in a third condition connecting said winding on the first core portion in said circuit.

18. An electrically controllable inductor comprising magnetic control means having two spaced regions of significant magnetic permeability and a control winding for controlling the magnetic flux passing between said spaced regions, an element of saturable ferromagnetic material extending a substantial portion of the distance between said two spaced regions and conducting said magnetic flux, and a winding on said element including two wide flat portions of electrically conductive material, one of said wide flat portions passing over said element and the other passing under said element, with their widths being substantially parallel with one another and with their ends diverging at a substantial angle from one another as seen in a direction perpendicular to their widths and having a wide flat area of electrically conductive material therebetween having its plane substantially parallel with the widths of said winding portions.

19. An electrically controllable inductor comprising magnetic control means including a control winding and having two spaced regions of significant magnetic permeability, first and second elements of magnetically saturable ferromagnetic material extending between said two spaced regions and each carrying magnetic flux from said control means between said spaced regions, said first element having a larger effective cross sectional area than said second element, a frequency-responsive signal circuit, at least one signal winding on each of said elements, and switch means having at least two conditions, in its first condition connecting a winding on said first element into said circuit and in its second condition connecting a winding on said second element into said circuit.

20. An electrically controllable inductor having magnetic control means including two spaced regions of significant magnetic permeability, a rod of ferrite material bridged across between said regions, a winding on said rods intermediate said regions and being coupled to circuit means having a predetermined range of frequencies, and at least one turn of electrically conductive material around said rod between said regions and being effectively short-circuited by inductance and capacitance resonant with each other at a frequency below said range.

21. A controllable inductor comprising a yoke of magnetically permeable material defining spaced regions, a control winding on said yoke, first, second, and third rods of ferrite material each adjacent to both of said spaced regions and each extending a substantial portion of the distance between said regions, said first ferrite rod having a larger effective cross sectional area than said second or third rod, and at least one winding on each of said rods.

References Cited in the file of this patent

UNITED STATES PATENTS

| | | |
|---|---|---|
| 428,620 | Lemp | May 27, 1890 |
| 1,140,920 | Sieber | May 25, 1915 |
| 1,412,933 | Gordon | Apr. 18, 1922 |
| 1,743,737 | Thompson | Jan. 14, 1930 |
| 2,462,423 | Polydoroff | Feb. 22, 1949 |
| 2,466,028 | Klemperer | Apr. 5, 1949 |
| 2,536,260 | Burns, Jr. | Jan. 2, 1951 |
| 2,598,467 | Van Yzeren | May 27, 1952 |
| 2,648,824 | Frielberg | Aug. 11, 1953 |